(12) United States Patent
Ghanem

(10) Patent No.: US 12,496,668 B1
(45) Date of Patent: Dec. 16, 2025

(54) SYSTEMS AND METHODS FOR INSTALLING A FIRST COMPONENT TO A SECOND COMPONENT IN MOTION

(71) Applicant: ProcessChamp, LLC, Columbus, OH (US)

(72) Inventor: George Ghanem, Columbus, OH (US)

(73) Assignee: ProcessChamp, LLC, Columbus, OH (US)

( * ) Notice: Subject to any disclaimer, the term of this patent is extended or adjusted under 35 U.S.C. 154(b) by 26 days.

(21) Appl. No.: 18/534,055

(22) Filed: Dec. 8, 2023

Related U.S. Application Data

(63) Continuation-in-part of application No. 18/142,403, filed on May 2, 2023.

(60) Provisional application No. 63/337,719, filed on May 3, 2022.

(51) Int. Cl.
*B25J 9/16* (2006.01)
*B23P 21/00* (2006.01)
*B62D 65/12* (2006.01)
*B62D 65/18* (2006.01)

(52) U.S. Cl.
CPC ............ *B23P 21/004* (2013.01); *B62D 65/12* (2013.01); *B62D 65/18* (2013.01)

(58) Field of Classification Search
CPC ...... B23P 21/004; B23P 19/105; B62D 65/12; B62D 65/18; B62D 65/024; B25J 9/0084
See application file for complete search history.

(56) References Cited

U.S. PATENT DOCUMENTS

| 5,771,553 A | 6/1998 | Sim et al. |
| 5,848,747 A | 12/1998 | Nishi |
| 6,273,483 B1 | 8/2001 | Bone |
| 6,381,556 B1 | 4/2002 | Kazemi |

(Continued)

FOREIGN PATENT DOCUMENTS

| CN | 106708027 A | * | 5/2017 | ........... G05D 1/0016 |
| EP | 2335885 A1 | * | 6/2011 | ............ B25J 9/1697 |

(Continued)

OTHER PUBLICATIONS

English translation of EP-2335885-A1 (Year: 2011).*

(Continued)

*Primary Examiner* — Jun S Yoo

(74) *Attorney, Agent, or Firm* — Standley Law Group LLP; Jeffrey S. Standley; Adam J. Smith

(57) ABSTRACT

Systems and methods for installing components to other components in motion using machine vision systems and an artificial intelligence derived model are provided. Robots pick up the first component, move it through the work area alongside a conveying subassembly with the second component at matched speed and position, and synchronously place the first component at the second component under the command of a controller based on data received from sensors and machine vision systems regarding speed and position of the second component in the work area and surface feature position information for one or both of the first and second component. At least the machine vision data is processed by an artificial intelligence derived model to calculate offsets between the measured surface feature positions and reference surface feature positions to achieve the synchronous installation.

12 Claims, 11 Drawing Sheets

(56) References Cited

U.S. PATENT DOCUMENTS

| | | | |
|---|---|---|---|
| 8,180,487 | B1 | 5/2012 | Vangal-Ramamurthy et al. |
| 10,049,443 | B2 | 8/2018 | Barlos et al. |
| 10,095,214 | B2 | 10/2018 | Ghanem |
| 10,101,725 | B2 | 10/2018 | Ghanem |
| 10,551,179 | B2 | 2/2020 | Lonsberry et al. |
| 10,571,889 | B2 | 2/2020 | Ghanem |
| 10,591,277 | B2 | 3/2020 | Kallay et al. |
| 11,029,713 | B2 | 6/2021 | Haven et al. |
| 2013/0329012 | A1 | 12/2013 | Bartos et al. |
| 2015/0104284 | A1 | 4/2015 | Riedel |
| 2015/0120054 | A1 | 4/2015 | Watanabe |
| 2015/0190926 | A1 | 7/2015 | Miegel et al. |
| 2018/0043540 | A1 | 2/2018 | Satou |
| 2018/0120218 | A1 | 5/2018 | Shultis et al. |
| 2019/0076949 | A1 | 3/2019 | Atherton et al. |
| 2019/0138009 | A1 | 5/2019 | Saito |
| 2019/0143541 | A1 | 5/2019 | Nemallan |
| 2019/0331480 | A1 | 10/2019 | Lonsberry et al. |
| 2019/0332084 | A1 | 10/2019 | Haven |
| 2020/0130189 | A1* | 4/2020 | Ghanem ................ B25J 9/1697 |
| 2020/0240772 | A1 | 7/2020 | Lonsberry et al. |
| 2020/0262057 | A1 | 8/2020 | Saez et al. |
| 2020/0262078 | A1 | 8/2020 | Saez et al. |
| 2020/0262079 | A1 | 8/2020 | Saez et al. |
| 2020/0377004 | A1 | 12/2020 | Zhang et al. |
| 2020/0377012 | A1 | 12/2020 | Saez et al. |
| 2020/0380273 | A1 | 12/2020 | Saez et al. |
| 2020/0398743 | A1 | 12/2020 | Huber et al. |
| 2021/0042665 | A1* | 2/2021 | Ghanem ................ B25J 9/163 |
| 2021/0150760 | A1 | 5/2021 | Haven et al. |
| 2021/0237200 | A1 | 8/2021 | Wang et al. |
| 2021/0237211 | A1 | 8/2021 | Saez et al. |
| 2021/0237212 | A1 | 8/2021 | Saez et al. |
| 2021/0387346 | A1 | 12/2021 | Gillett |
| 2022/0001532 | A1 | 1/2022 | Ghanem et al. |
| 2022/0016762 | A1 | 1/2022 | Ghanem et al. |
| 2022/0152785 | A1 | 5/2022 | Skurkis et al. |
| 2022/0176564 | A1 | 6/2022 | Saez et al. |
| 2023/0052365 | A1 | 2/2023 | Vargo et al. |
| 2023/0101387 | A1 | 3/2023 | Ghanem |

FOREIGN PATENT DOCUMENTS

| | | |
|---|---|---|
| EP | 1645439 B1 | 8/2011 |
| WO | 2005087451 A1 | 9/2005 |
| WO | 2005105389 A1 | 11/2005 |

OTHER PUBLICATIONS

English translation of CN-106708027-A (Year: 2017).*
Wired, How the Tesla Model S is Made—Tesla Motors Part 1 youtube video webpage, Jul. 16, 2013, 2 pages.

* cited by examiner

SYSTEMS AND METHODS FOR INSTALLING A FIRST COMPONENT TO A SECOND COMPONENT IN MOTION

CROSS-REFERENCE TO RELATED APPLICATIONS

This application is a continuation-in-part of U.S. application Ser. No. 18/142,403 filed May 2, 2023, which claims the benefit of U.S. Provisional Application Ser. No. 63/337,719 filed May 3, 2022, the disclosures of each of which are hereby incorporated by reference as if fully restated herein.

TECHNICAL FIELD

Exemplary embodiments relate generally to systems and methods for installing a first component to a second component in motion, such as using machine vision components and an artificial intelligence ("AI") derived model.

BACKGROUND AND SUMMARY OF THE INVENTION

Since the days of Henry Ford, vehicles are commonly mass produced on an assembly line. Under this manufacturing scheme, vehicle frames may be moved through a factory space while undergoing further assembly, which may include modifications to the frame itself (e.g., welding, painting) and/or the addition or components to the frame (e.g., doors, seating, engine and powertrain, suspension, entertainment systems, and the like). One such component that eventually needs added to all automobiles is the wheel. The typical automobile includes four wheels, two of which are mounted to each of two axles. However, other types of vehicles exist which include fewer or greater axles and/or wheels in various arrangements.

Mounting wheels to axles typically requires aligning holes within a wheel to studs extending from a hub and bearing assembly, which is mounted to the axle. Variations on the exact arrangement and mounting configuration exist. Regardless, careful alignment is needed. This sometimes requires that the vehicle frame or other components be held stationary while the mounting is accomplished. Regardless, the wheels are generally mounted manually so that an operator can visually adjust the wheel position for proper alignment and mounting.

While certain benefits may arise from automating vehicle production, automating wheel mounting is particularly difficult due to unique alignment issues, such as with the wheel stud and hole arrangement and variations in wheel and hub presentation. For example, without limitation, stud arrangement within hubs, hub arrangement on axles, wheel hole arrangement within wheels, vehicle frame presentation, hub presentation, combinations thereof, or the like, may not be uniform or consistent. These inconsistencies may require on-the-fly, vehicle specific adjustments for successful mounting, which heretofore required manual operation.

What is needed is a system and method for mounting wheels to partially assembled vehicles in motion. Systems and methods for mounting wheels to partially assembled vehicles in motion are provided. The disclosed systems and methods may utilize one or more machine vision components to identify mounting points for the wheels, such as by use of cameras and artificial intelligence ("AI") software. The systems and methods disclosed may permit mounting in a fixtureless manner.

The system may comprise partially assembled vehicles mounted to or otherwise carried by a conveyor system of various type. Once sensors are connected and calibrated, the system may be activated for regular production.

As a vehicle is moved into an assembly zone, it may be detected by a parts sensor. A first camera may be activated to collect hub information, such as position and presentation of the hub and/or wheel studs. The vehicle's velocity may be monitored by velocity sensors as the vehicle continues through the assembly zone. The velocity sensors may be activated when the parts sensor and/or camera detect the vehicle. A second camera may be activated to collect wheel information, such as position and presentation of the wheel and/or stud holes. Lug nuts may be placed at the wheel, such as by a lug nut dispensing subsystem. Collected data regarding the hubs, wheels, and/or vehicle velocity may be transmitted to a controller. The controller may utilize software, such as but not limited to a multi-iterative, best fit, weighted vector analysis, to determine offsets for the wheel placement against reference points. Robot(s) may be commanded to pick up the wheels, such as with the lug nuts, and moved along synchronously with the vehicle within the assembly zone to install the wheels at the hubs. The lug nuts may be subsequently secured to affix the wheels. If changes to speed of the partially assembled vehicle are detected, updated commands may be used to the robot(s) to continue to match speed and/or position. The controller may automatically compensate for known delays in signaling, for example.

An inspection scan may be performed and updates may be provided to the controller to optimize further production, such as using artificial intelligence technology to update the weights applied to the multi-iterative, best fit, weighted vector analysis.

The robot(s) may be returned to a home position to await a next vehicle.

While primarily discussed with regard to wheel mounting, the system, method, and/or components shown and/or described herein may be utilized for synchronous, fixtureless mounting and/or other installation of other vehicle components (e.g., instruments, entertainment systems, navigation systems, trim, operational controls, seating, and the like) and/or other types and/or kinds of components (e.g., non-vehicular components or applications).

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
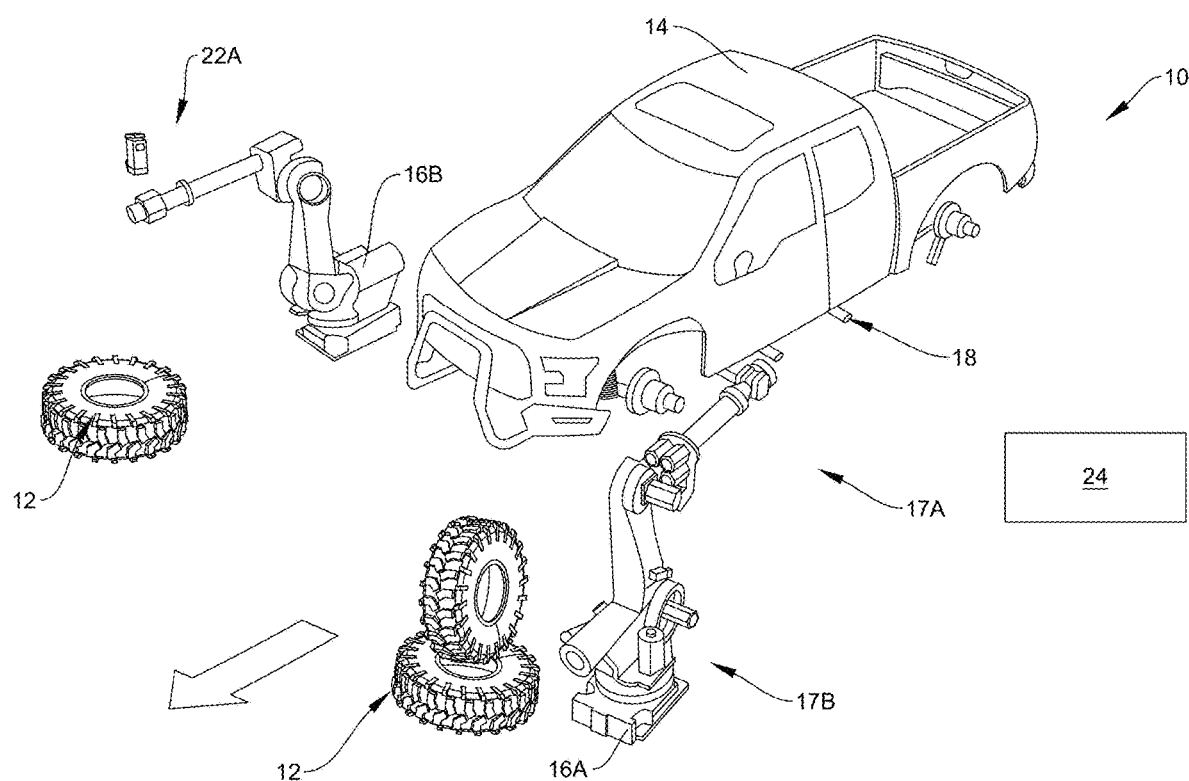
FIG. 1 is a perspective view of an exemplary system for mounting wheels to partially assembled vehicles in motion.
Figure 2:
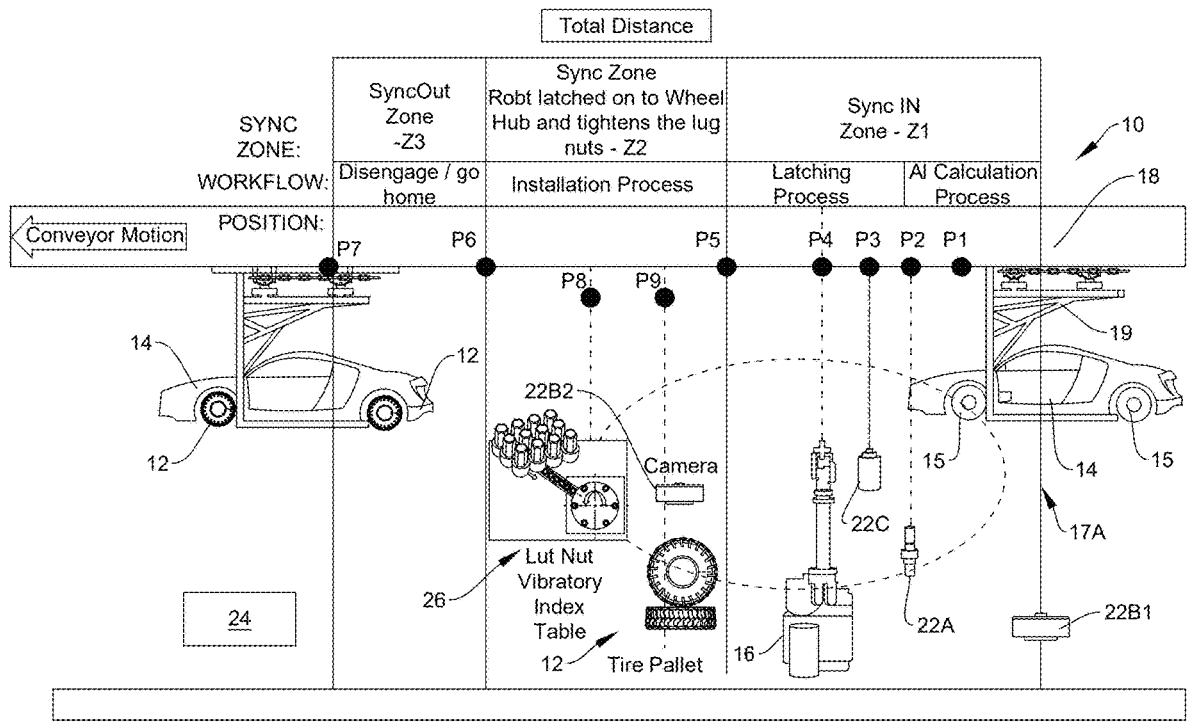
FIG. 2 is a side view of another exemplary embodiment of the system of FIG. 1 with annotations in the form of a timeline identifying assembly processes.

FIG. 1 and FIG. 2 illustrates an exemplary system 10 for mounting wheels 12 to partially assembled vehicles 14 which are in motion. The system 10 may comprise one or more conveyors 18 and/or related components such as, but not limited to, belts, trolleys, hangers, autonomous motorized vehicles (AMVs) 31, fixtures, combinations thereof, or the like for holding the partially assembled vehicles 14 and moving them through the system 10 and/or a larger assembly line, such as an assembly line or factory floor. The conveyor 18 may be dedicated for the system 10 or be part of a larger conveyor 18 and/or assembly line. The AMVs 31 may comprise autonomous guided vehicles, autonomous mobile robots, combinations thereof, or the like.

In exemplary embodiments, without limitation, operation of the AMVs 31 and associated components, such as but not limited to the partially assembled vehicles 14, may be accomplished using the systems, methods, and/or components shown and/or described in U.S. Pat. No. 11,294,363 issued Apr. 5, 2022 and hereby incorporated by reference. In this manner, by way of non-limiting example, the vehicle 14 may be kept in motion about a factory floor or other facility for installation of multiple components, including, but not limited to, the wheels 12. For example, the same or similar embodiments of the system 10, or components thereof such as the robot(s) 16 and/or controllers 24, may be adapted for mounting or otherwise installing other vehicle 14 components while partially assembled while the vehicle 14 is moving, including but not necessarily limited to, seating, interior fabric, entertainment systems, navigational systems, instruments, interior trim, safety components, vehicle 14 controls, combinations thereof, or the like, such as in a fixtureless manner.

The system 10 may comprise one or more robots 16. The robots 16 may be configured for three-dimensional movement, such as within one or more assembly zones. The robots 16 may be configured for grabbing, placing, and/or securing the wheels 12 and/or related components, such as, but not limited to, lug nuts 20. Some or all of the robots 16 may comprise generalized or specialized components adapted for the same including, but not limited to, grippers, wrenches (e.g., lug wrenches), nut runners, vacuum devices, machine vision systems or components thereof, sensors, combinations thereof, or the like. Multiple robots 16A, 16B may be provided, such as on opposing sides of the conveyor 18 and/or different locations along the conveyor 18, to address opposing sides of the vehicle 14 and/or to perform various functions (e.g., wheel 12 placement, lug nut 20 placement, lug nut 20 securement, combinations thereof, or the like) along the conveyor 18. Alternatively, or additionally, a single robot 16 or single one of the robots 16 may be configured to mount multiple wheels 12 and/or perform multiple functions.

The system 10 may comprise sensors 22 or a same or various type. The sensors 22 may be in electronic communication, wired and/or wirelessly, with one or more controller 24.

The sensors 22 may comprise one or more part sensors 22A. The part sensor(s) 22A may be configured to detect the presence of the vehicle 14, or portions thereof, within a particular area or zone. The part sensor(s) 22A may comprise, for example without limitation, lasers, photo eyes, ultrasonic emitters/detectors, proximity detectors, machine vision systems, magnetic field detectors, combinations thereof, or the like. Some or all of the sensors 22A may be used by the controller 24 to establish a nominal tracking position coordinate frame 17A for the vehicle 14, sometimes referred to herein as "Tnom". Coordinate frames 17B may, alternatively or additionally, be established at one or more or the robots 16 and/or at other locations.

The sensors 22 may, alternatively or additionally, comprise one or more machine vision systems 22B. Each of the machine vision system(s) 22B may comprise one or more cameras. The machine vision system(s) 22B may work together or independent of one another and/or other sensors 22. The machine vision system(s) 22B1, 22B2, or components thereof such as the cameras, may be mounted to the robot(s) 16, along the conveyor 18, within one or more zones of the conveyor 18, overhead, forward of one or more assembly zones, behind one or more assembly zones, at the floor of one or more assembly zones, combinations thereof, or the like. In exemplary embodiments, without limitation, a first machine vision system 22B1 may be located at a material handling portion of each of the robot(s) 16, a second machine vision system 22B2 may be located adjacent to a storage area for the wheels 12. Any number and location of machine vision system(s) 22B and/or related cameras may be provided. For example, without limitation, one or more of the machine vision system(s) 22B may be located overhead of the assembly area. The one or more machine vision system(s) 22B and/or other sensors 22 may be electronically connected to the controller 24. The machine vision system 22B, or the controller 24, may comprise object recognition software configured to process images provided from the cameras to detect various objects, surface features, text, combinations thereof, or the like.

The sensors 22 may, alternatively or additionally, comprise one or more continuous body velocity sensors 22C, such as, but not limited to, one or more lasers. The continuous body velocity sensor(s) 22C may be configured to record velocity of the vehicle 14 as it passes along the conveyor 18. The continuous body velocity sensors 22C may be in electronic communication with the controller 24. Velocity determinations may be made at the continuous body velocity sensors 22C and/or the controller 24.

In exemplary embodiments, without limitation, the vehicle 14 may enter a first zone Z1. Placement of the vehicle 14 and/or other components relative to a reference frame may be established by the sensors 22 and/or controller 24 while the vehicle 14 moves into and/or through the first zone Z1 in exemplary embodiments. For example, without limitation, the vehicle's 14 placement within a carrier trolly 19 of the conveyor 18, spacing of the carrier trolleys 19 along the conveyor 18, positioning of wheel studs and holes, stud arrangement within hubs 15, hub 15 arrangement on axles, wheel hole arrangement within wheels 12, vehicle 14 presentation, hub 15 presentation, combinations thereof, or the like, may vary.

In exemplary embodiments, a synchronization process may be undertaken by the system 10 within the first zone Z1 of the conveyor 18. A first machine vision system 22B1 may be positioned at an entrance to the first zone, such as at P1. The first machine vision system 22B1 may be configured to detect entry of the vehicle 14 within the first zone Z1, and/or as the vehicle 14 moves into the first zone Z1, determine vehicle 14 position and/or pose and/or hub 15 position and/or pose. Data from the first machine vision system 22B1 may be compared against one or more nominal frames, such as Tnom. Any offsets between Tnom and the vehicle 14 position and/or hub 15 may be determined, such as at the controller 24. Data from the first machine vision system 22B1 may be compared against one or more reference points, such as expected vehicle 14 position and/or pose, and/or hub 15 position and/or pose. Such reference points may comprise, for example without limitation, surface features or components thereof. For example, without limitation, the reference points may include wheel wells, hub 15 edges, wheel studs, axes center-points, brake pad locations, vehicle frame front, combinations thereof, or the like.

The controller 24 may comprise one or more software modules for calculating the offsets and/or compensatory adjustments, such as between measured positions and reference position, which may utilize artificial intelligence ("AI"). Such software modules may comprise those shown and/or described in at least US Pub. No. 2022/0016762 published Jan. 20, 2022 from U.S. application Ser. No. 17/490,810 (the "'762 Pub."), the disclosures of which are hereby incorporated by reference, by way of non-limiting example. The controller 24 may utilize, for example without limitation, a multi-iterative, best fit, weighted vector analysis, to determine offsets.

The part detector 22A may be configured to detect the vehicle 14 at P2 and activate one or more robots 16 for wheel 12 mounting. The controller 24 may be configured to cause the robot(s) 16 to move at a velocity consistent with the vehicle 14, such as based on data from the one or more velocity sensors 22C at P3, by way of non-limiting example. The timing for activating the one or more robots 16 and their speed of travel may be made and/or adjusted initially, periodically, continuously, combination thereof, or the like, such as based on data taken and provided (e.g., from velocity sensor(s) 22C) periodically, continuously, combination thereof, or the like accordingly. Such adjustments may be made by way of the controller 24, by way of non-limiting example. The robot(s) 16 themselves may be entirely moveable, or a distal or other portion of the robot(s) 16 carrying the wheels 12 may be so adjusted for a matching velocity. The controller 24 may be configured to maintain velocity of the robot(s) 16 and/or wheel(s) 12 carried by the same within a predetermined range of the measured velocity of the vehicle 14.

The position and/or pose of the wheels 12 may be determined by a second machine vision system 22B2, by way of non-limiting example. Such review may be activated by detection of the vehicle 14 at the first machine vision system 22B1 and/or the part sensor(s) 22A, by way of non-limiting example. In other exemplary embodiments, the second machine vision system 22B2 may be periodically and/or continuously activated. The second machine vision system 22B2 may be configured to monitor position and/or of the wheels 12 relative to reference data. For example, without limitation, rim outline, rim features, rim holes (e.g., wheel stud holes), tire outline, combinations thereof, or the like may be measured against reference data. Offsets and/or adjustment for pickup and placement may be determined at the controller 24, such as at the AI module 23, by way of non-limiting example. The first and second machine vision systems 22B1, 22B2 may be entirely disparate subsystems, or may comprise common components.

At P4, the one or more robots 16 may be set to home positions. Instructions for mounting wheels 12 to the vehicle 14 may be provide by the controller 24.

An installation process may be undertaken by the system 10 at a second zone, Z2, of the system 10. At P5, the robot 16 may, based on instructions received from the controller 24, pick up one of the wheels 12 and place them on the vehicle 14. This may be repeated by the same or different robot(s) 16 to install wheels 12 at each of the hubs 15. The timing and positioning of the robot(s) 16 may be adjusted, such as at the controller 24, based on data received from the sensors 22 during the synchronization and/or installation processes. The robot(s) 16 may move the wheels 12 with the vehicle 14 along the conveyor 18 to match the velocity of the vehicle 14 during installation. For example, without limitation, the robot(s) 16 may move their arms and/or the robot(s) 16 themselves may be mounted on movable platforms.

At P8, a lug nut dispensing subsystem 26 may be activated. The lug nut dispensing subsystem 26, as explained in further detail herein, may be configured to position the lug nuts 20 for pickup by same or different robot(s) 16 and securement to the hubs 15 to secure the wheels 12 to the vehicle 14. One or more machine vision systems 22B may be utilized to account for any offsets in the lug nuts 20 and/or lug nut dispensing subsystem 26, such as at the controller 24 against reference data including expected lug nut 20 position and/or pose. In exemplary embodiments, without limitation, the lug nut dispensing subsystem 26 may be activated based on data from the sensors 22, such as, but not limited to, the parts sensor 22A.

At P7, the robot(s) 16 may be disengaged and returned to the home position for the next vehicle 14.

At P9, the same or different machine vision systems 22B may perform an inspection scan of the mounted wheel(s) 12. Data from the inspection scan may be transmitted to the controller 24, such as for comparison with reference points at the AI module 23 to update future offset calculations.

Operations of the controller 24 and/or AI module 23 may be performed in accordance with the '762 Pub., by way of non-limiting example.

Figure 3:
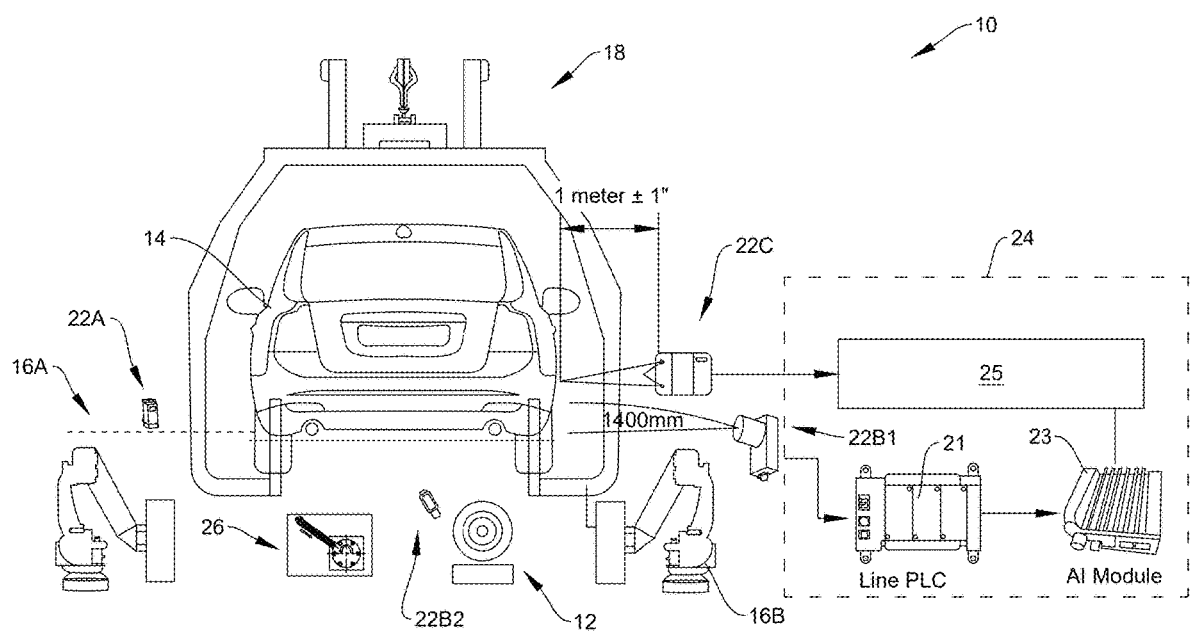
FIG. 3 is a front view of the system of FIG. 2.

As illustrated in FIG. 3, in exemplary embodiments, the second machine vision system 22B2 may be positioned and/or otherwise configured to capture wheel 12 data, including rim hole placement, as wheels 12 are provided for pickup by the robot(s) 16. Captured data may include wheel 12 size, hole placement, wheel 12 pose, and hole pitch, to name some non-limiting examples. The first machine vision system 22B1 may be positioned and/or otherwise configured to capture hub 15 data, including stem placement, as vehicles 14 are provided for wheel 12 mounting. Captured data may include hub 15 size, stud placement, hub 15 pose, and stud pose, to name some non-limiting examples. Data from the sensors 22, including but not necessarily limited to the first and second machine vision systems 22B may be provided to the controller 24. The controller 24 may comprise one or more line PLCs 21, the AI module 23, and/or one or more line tracking interface boards 25, by way of non-limiting example.

The velocity sensor 22C may be positioned and/or otherwise configured to capture velocity data for the vehicle 14, which may be independent of the carrier and/or conveyor 18 in exemplary embodiments. The velocity sensor 22C may comprise a pulse encoded laser sensor, by way of non-limiting example, such as, but not limited to, the LS9500410 Pulse encoder (9500 LaserSpeed Pro from NDC Technologies, https://www.ndc.com/). The velocity of the power and free conveyor 18 and the carrier are, in exemplary embodiments without limitation, not used for tracking.

Figure 4:
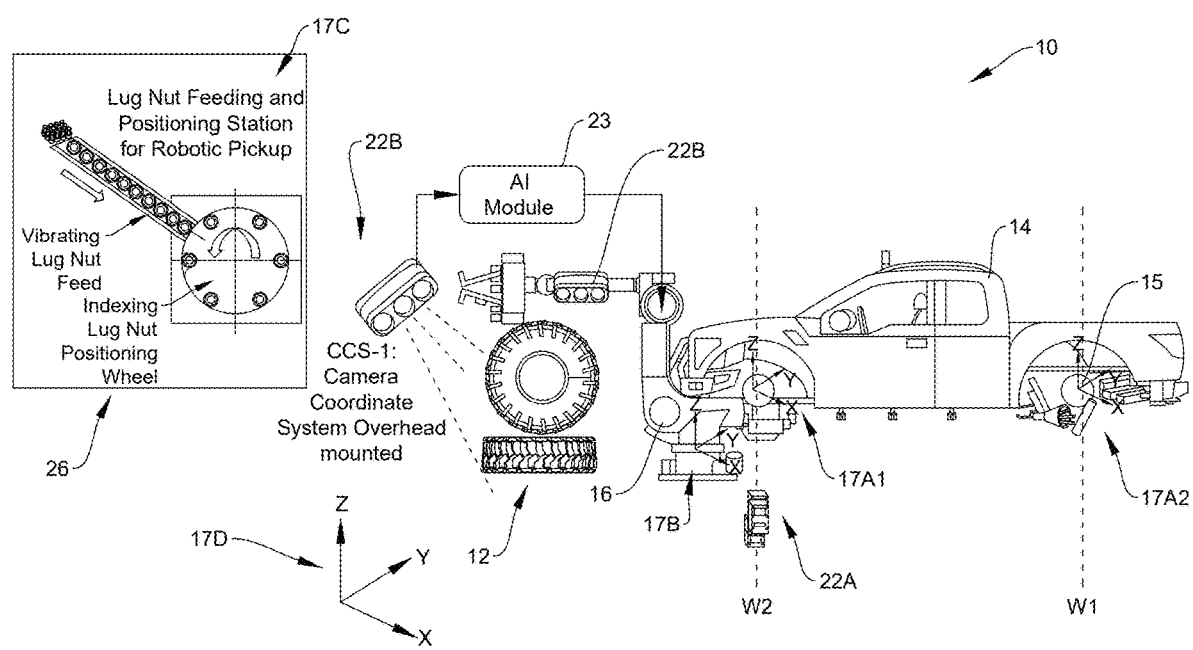
FIG. 4 is a side view of the system of another exemplary embodiment of the system of FIGS. 1-3.

As illustrated in FIG. 4, in exemplary embodiments, positions of the hubs 15 may be used to establish boundaries W1, W2 for the system 10. Reference frames 17A1, 17A2 may be established at each of the hubs 15 in exemplary embodiments, without limitation. Position and/or pose of the hubs 15 may be determined by one or more of the sensors 22. Reference frames 17B for the robot(s) 16 may be preprogrammed or otherwise known, such as from calibration. Reference frames 17C for the lug nut dispensing subsystem 26 may be preprogrammed or otherwise known, such as from calibration. Reference points may be preprogrammed or otherwise known, such as at the controller 24, for an ideal part relative to the reference frames 17C. For example, without limitation, ideal wheel stud placement around each hub 15, lug nut holes on each wheel 12, hub 15 placement relative to other parts of the vehicle 14, lug nut 20 placement relative to the lug nut dispenser subsystem 26, combinations thereof, or the like may be known and/or preprogrammed at the controller 24, such as for an ideal or reference part(s). Offsets from these reference points and/or reference frames 17 against actually measured data from the machine vision systems 22B may be made for one or more of the wheels 12, hubs 15, lug nuts 20, and/or the lug nut dispensing subsystem 26, by way of non-limiting example. The controller 24 may be configured to command the robot(s) 16 to operate in accordance with the offsets so that wheels 12 may be reliably mounted to the vehicles 14 despite these discrepancies. For example, the controller 24 may utilize an iterative, best fit algorithm, such as but not limited to as shown and/or described in the '762 Pub.

As noted, some or all of the machine vision systems 22B may be mounted overhead, at the robot(s) 16, at a storage area for the wheels 12, at a storage area for the lug nuts 20 and/or at the lug nut dispensing subsystem 26, combinations thereof, or the like. A system wide reference frame 17D may be preprogrammed or otherwise known, such as from calibration. Alternatively, or additionally, the system wide reference frame 17D may be set to one of the components, such as but not limited to the robot(s) 16, the vehicle 14, or the like.

Figure 5:
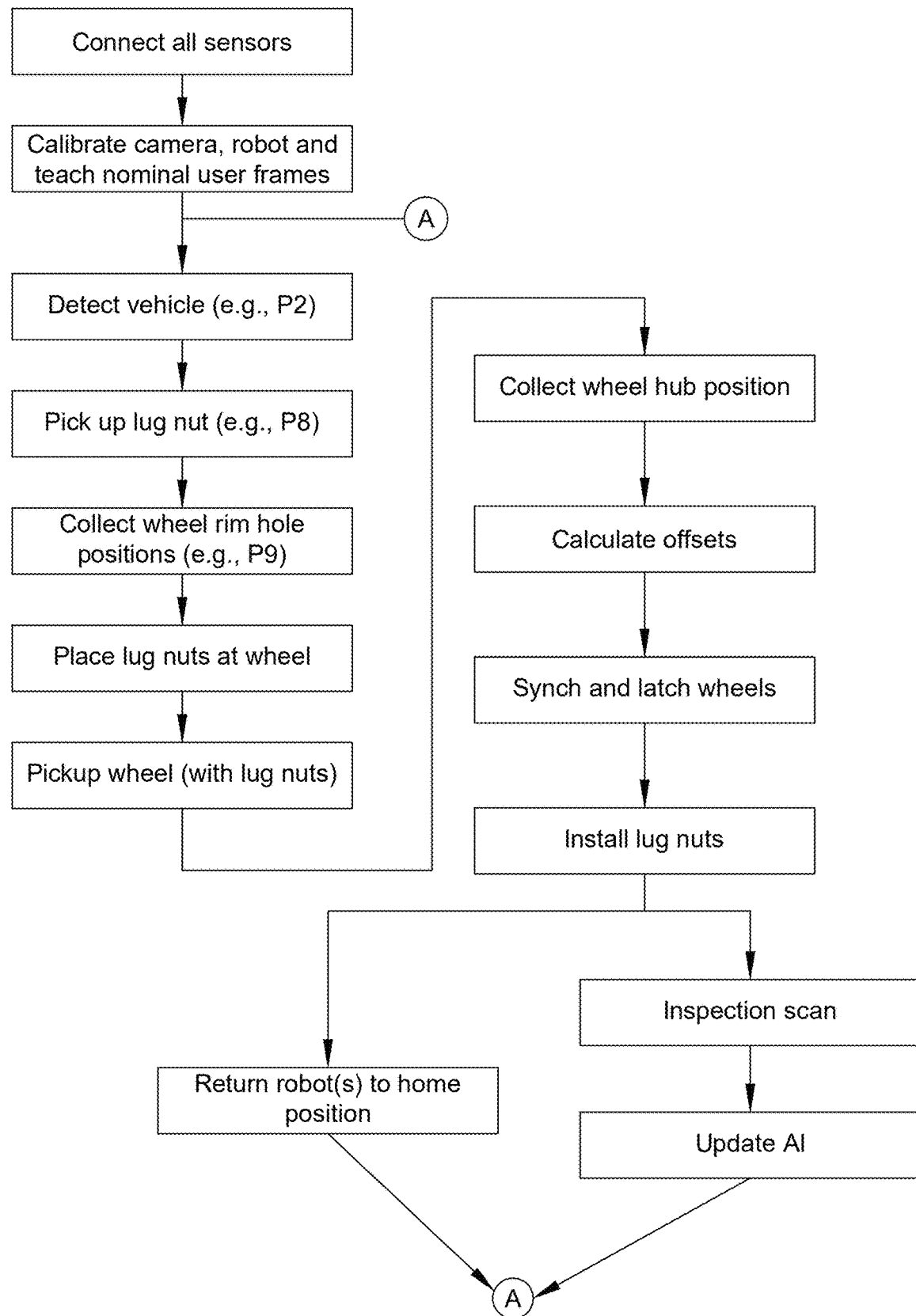
FIG. 5 is a flow chart with exemplary logic for operating the system of FIGS. 1-4.

FIG. 5 provides an exemplary method for operating the system 10. The sensors 22 may be connected. Some or all of the sensors 22 and/or robot(s) 16 may be calibrated, such as by operating the system 10 in a calibration mode. The controller 24 may be configured to command and/or control operation of the system 10 in such a calibration mode. Adjustments from calibration may be made at the controller 24, such as by way of the AI module 23.

Some or all of the sensors 22 and/or robot(s) 16 may be programmed with nominal user frames 17 at the controller 24. The vehicle 14 may be detected, such as at P2 by the part sensor 22A, and reported to the controller 24. The robot(s) 16 may be commanded, such as by the controller 24, to pick up the lug nuts 20, such as at the lug nut dispensing subsystem 26 (e.g., P8). The controller 24 may be configured to activate the first machine vision system 22B1 to collect wheel 12 rim hole positions, such as at P9.

The controller 24 may receive the wheel 12 data and output offset data, such as but not limited to new tool center point ("TCP") data to the robot(s) 16 for placing the lug nuts 20 into the wheel 12 and/or picking up the wheels 12. In exemplary embodiments, the robot(s) 12 may use a same spreader gripper, nut runner, and/or end/effector for lug nut 20 pickup and the wheel 12 pickup, though such is not required.

The robot(s) 16 may receive the offset data, such as from the controller 24, and move to a new pickup TCP to pick up the wheel 12 and standby for the vehicle 14 to enter Z2, such as at P4.

The hub 15 may be detected, such as by the part sensor 22A or the first machine vision system 22B1, the first and/or second machine vision systems 22B1, 22B2 may collect hub 15 position data and report the same to the controller 24.

The controller 24, such as but not limited to the AI module 23, may receive the hub 15 data and output offset data, such as but not limited to new tool center point ("TCP") data to the robot(s) 16 for placing the lug nuts 20 into the hubs 15 and/or placing the wheels 12.

The robot(s) 16 may receive the offset data and move to a new pickup TCP to start synchronization and move to latch starting point, such as at P3.

At P4, for example, the robot(s) 16 may begin latching the wheels 12 to the hubs 15.

At P5, for example, the robot(s) 16 may finish latching the hubs 15, and start to install the lug nuts 20.

At P6, for example, the robot(s) 16 may finish installing the lug nuts 20.

At P7, for example, the robot(s) may leave the vehicle 14 and return to a home position to await the next vehicle 14.

At P9, the same or different machine vision system 22B may perform an inspection scan of the mounted wheel(s) 12. Data from the inspection scan may be transmitted to the controller 24, such as for comparison with targets at the AI module 23 and updating to future offset calculations.

A table 30 with exemplary input values, order of operations information, abbreviations, number type, formula, and examples for operating the system 10 is provided below. Operations 6, 7, and 8, by way of non-limiting example, may occur in parallel with one another. Certain items of Table 1 are made with reference to the figures, including FIG. 6.

TABLE 1

| Order of operations | Tracking Variable | Abbreviation | Number Type | Formula | Example |
|---|---|---|---|---|---|
| | ParameterNumber or GroupNumber | | | | Group1 |
| | ConveyorBelt | Not used | | | Axis3 (encoder) |
| | Execute | | | | Done |
| 1 | ConveyorBelt Origin (This is typically Taught, move TCP to belt origin point and use 3 points to set user frame and define X, Y etc.) | CBO | Vector XYZrpw | Offset from Robot Coordinate System | X = 10 Y = 8 Z = 10 Rx = 0, Ry = 0, Rz = 25 |
| 7 | InitialWheelPosition (Acquired from camera, e.g., 22B2) once hub 15 crosses conveyor 18 origin | IWP | Vector XYZrpw | Offset from CBO acquired from camera (e.g., 22B2, on robot arm) (not initially known) | X = −22 Y = 0 Z = 50 Rx = 0, Ry = 0. Rz = 0 |
| 6 | RecordedConveyorPosition (Acquired from camera, e.g., 22B2) | RCP | Vector XYZrpw | Conveyor 18 position at execute trigger acquired from the camera (e.g., 22B2) | X = 10 Y = 8 Z = 10 Rx = 0, Ry = 0, Rz = 25 |
| 2 | StartDistance | SD | Real number | | Fixed value = 15 units |
| 3 | EndDistance | ED | Real number | Fixed value | Fixed value = 100 units |
| 4 | TrackOption: StatDist/ ConveyorDist = 10 units TCPDist = 0.5 * 10 = 5 units MasterDistance = part in sync zone mode SyncOutDistance = 15 units | TCPD | Real no. Real no. True/false Real no. | ErrorID TCPD = 0.5 * CD | 10 units 5 units SyncOut after 85 units 15 units |
| 5 | ExecutionMode Start when camera (e.g., 22B1) triggers | | | When to begin tracking: | Immediate, Delayed or Queued |

Figure 6:
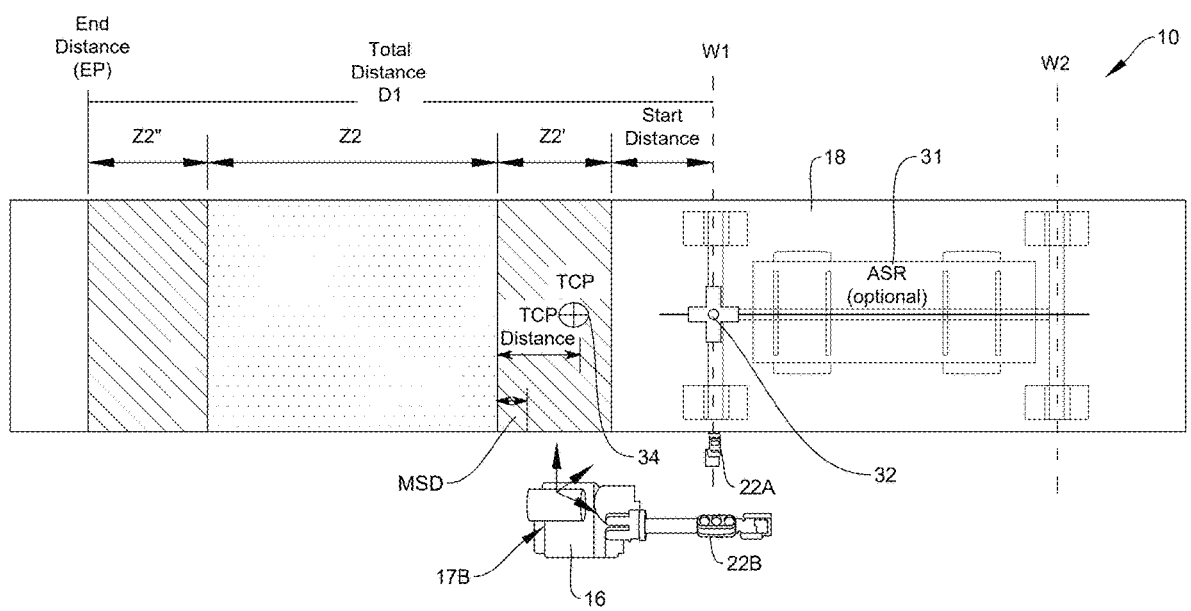
FIG. 6 is a simplified plan view of the systems of FIGS. 1-4 illustrating exemplary operation zones.

As illustrated in FIG. 6, by way of example, without limitation, a position of the conveyor 18 may be recorded and stored, such as at the controller 24, when tracking function triggered and started, such as by way of activation of the part sensor 22A by a vehicle 14 and/or machine vision system 22B. Upon activation, a vehicle origin 32 may be established, such as W1 located at the front hubs 15 of the vehicle 14. The vehicle origin 32 may be set to zero (e.g., (0,0,0,0,0,0)).

Offsets between the vehicle origin 32 and the world origin 17D may be determined, such as at controller 24 and/or the AI module 23. A TCP 34 based on the offset may be determined. A subzone, Z2', may be established for syncing in of the vehicle 14 and robot(s) 16. This may provide space and distance to match robot(s) 16 movement with the vehicle 14 before mounting the wheels 12. Within zone 2, which may be a synchronization zone, the robot(s) 16 may latch onto the hub 15 and tighten the lug nuts 20. A subzone, Z2", may be established for syncing out of the vehicle 14 and robot(s) 16 where the robot(s) 16 detach from the vehicle 14, slow, and return to a home position.

All distance values may be integers and real numbers.

In exemplary embodiments the TCP 34 may be determined as the total distance D1 divided in half. The end point, EP, may be known or preprogrammed.

A minimum synchronization distance (MSD) between the TCP 34 and the beginning of Z2 may be the minimum area for aborting the wheel 12 mounting.

Figure 7:
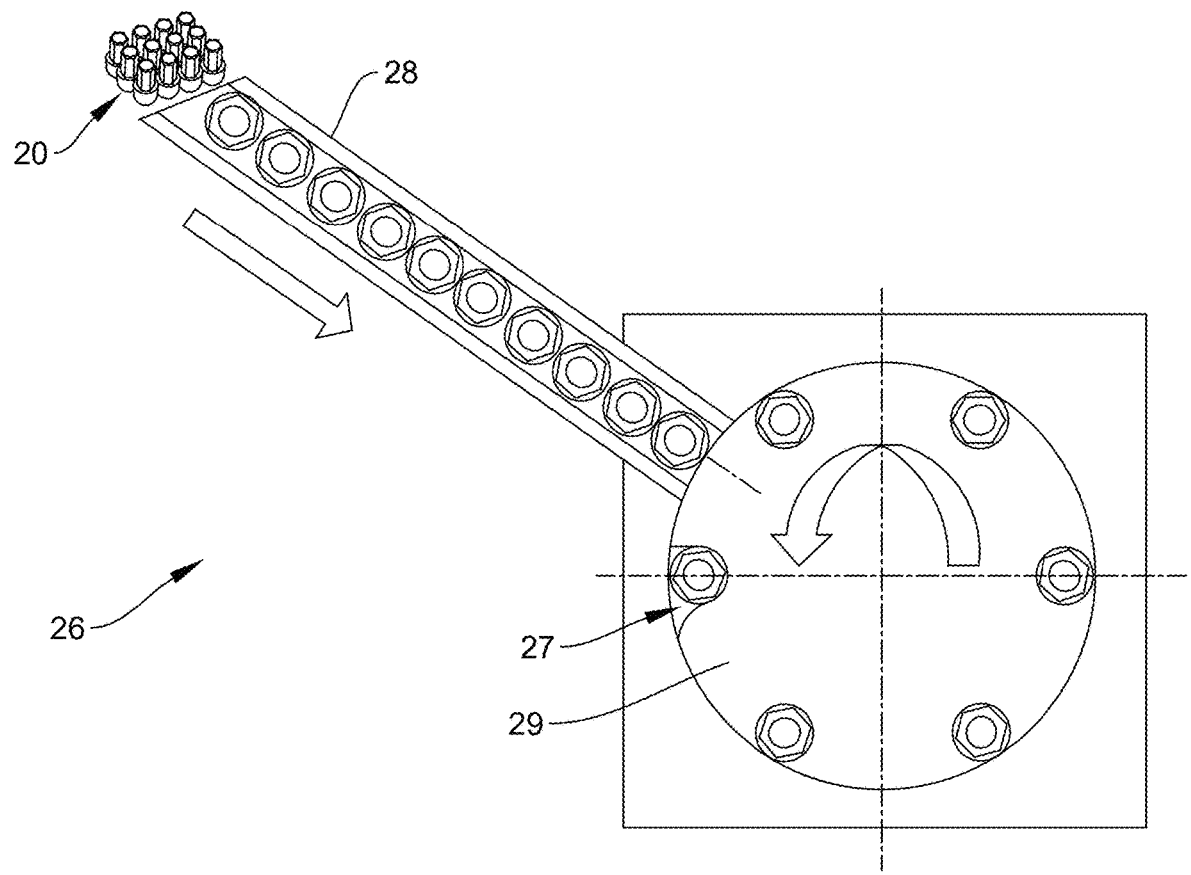
FIG. 7 is a detailed top view of an exemplary lug nut dispensing subsystem for use with the systems and methods of FIGS. 1-6.

As illustrated in FIG. 7, the lug nut dispensing subsystem 26 may comprise a repository of lug nuts 20. A feed may be configured to move the lug nuts 20 to an indexing lug nut positioning wheel 29, such as, but not limited to, by gravitational forces and/or vibration. The indexing lug nut positioning wheel 29 may comprise indents 27, each configured to accommodate a single one of the lug nuts 20. In this manner, the lug nuts 20 may be dispensed one at a time in a spaced apart manner. Spacing and/or shape of the indexing lug nut positioning wheel 29 may be configured to space the lug nuts 20 for pickup by a nut runner attachment on one or more of the robot(s) 16 in exemplary embodiments, without limitation.

The lug nuts 20 may be secured within spaces of the wheel 12 configured to accommodate the same. For example, without limitation, continued turning of the indexing lug nut positioning wheel 29 may move each of the lug nuts 20 into a respective space on the wheel 12. The wheel 12 may be positioned below the indexing lug nut positioning wheel 29, in exemplary embodiments, to receive the lug nuts 20. A spreader gripper, for example, without limitation, may be used by the robot(s) 16 to grasp and move the wheels 12. Alternatively, or additionally, the robot(s) 16 comprise one or more adapters configured to secure the lug nuts 20 in their spaced locations when retrieved from the lug nut positioning wheel 29.

The indexing lug nut positioning wheel 29 may be rotated to fill each of the indents 27 periodically.

Multiple lug nut dispensing subsystems 26 may be provided and/or utilized.

Figure 8A:
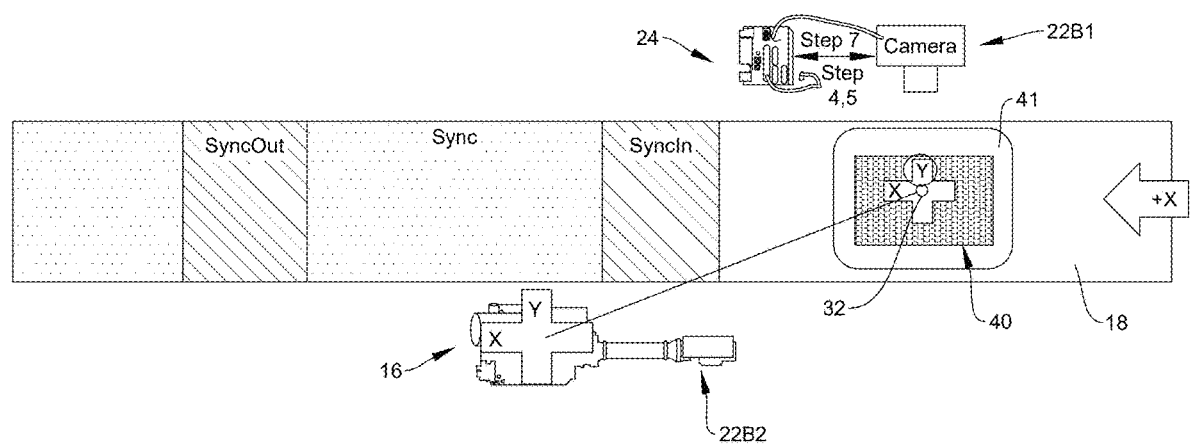
FIG. 8A is a simplified plan view of the system of FIG. 6 in a calibration mode.
Figure 8B:
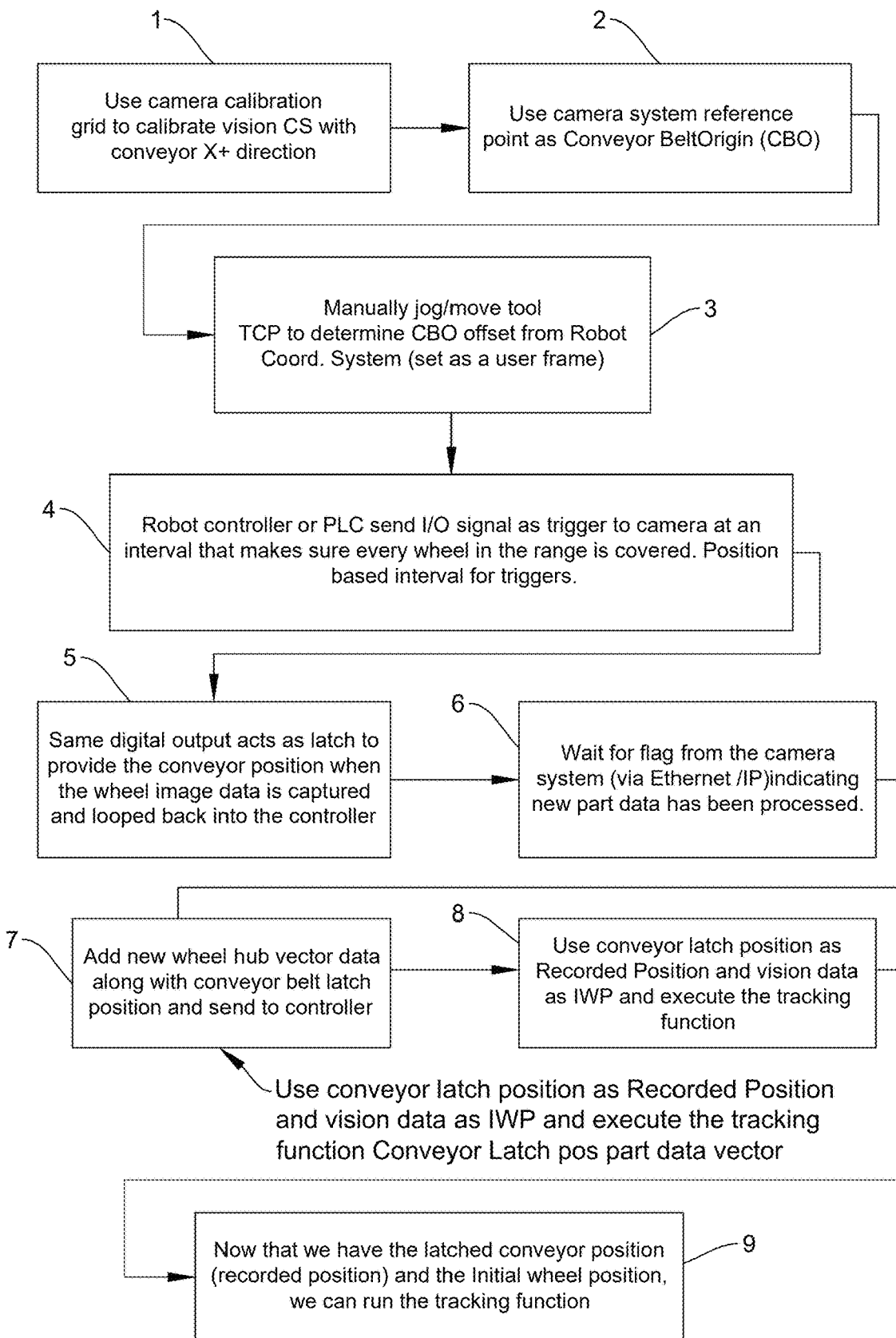
FIG. 8B is a flow chart with exemplary logic for operating the system of FIG. 8A in the calibration mode.

FIG. 8A illustrates the system 10 in a calibration mode, and FIG. 8B provides an exemplary method of using the same. In exemplary embodiments, without limitation, the machine vision system(s) 22B and/or other system 10 components may be calibrated by placement of a reference image 40, such as, but not limited to, a grid, target, electronically readable code (e.g., QR code), icon, combinations thereof, or the like on the conveyor 18. The locations of the reference image 40 relative to one or more fixed points may be known and/or provided to the controller 24. The reference image 40 may be placed in, or moved into, a field of view 41 of one or all of the cameras of the machine vision system(s) 22B. The camera(s) may be configured to read a center or other point of the reference image 40 as a vehicle origin 32. If the reference image 40 is moved to reach the field of view 41, an offset to account for the same may be provided to the controller 24. An offset may be determined as the reference image 40 moves into view of each of the cameras, in exemplary embodiments.

While one camera and/or machine vision system 22B may be discussed in some instances, any number of cameras and/or machine vision system(s) 22B in any number of locations may be utilized.

Some or all steps may be repeated, omitted, and/or performed in any order.

While wheel 12 mounting is primarily discussed, the system 10 may be adapted for mounting or otherwise installing other vehicle 14 components while partially assembled while the vehicle 14 is moving, including but not necessarily limited to, seating, interior fabric, entertainment systems, navigational systems, instruments, interior trim, safety components, vehicle 14 controls, combinations thereof, or the like, such as in a fixtureless manner. The system 10 and methods shown and/or described herein are not limited to use with vehicles 14 or vehicle components. These disclosures may be used to assemble two or more components of any type or kind while they remain in motion. Assembly may include fastening, welding, bonding, combinations thereof, or the like.

Figure 9:
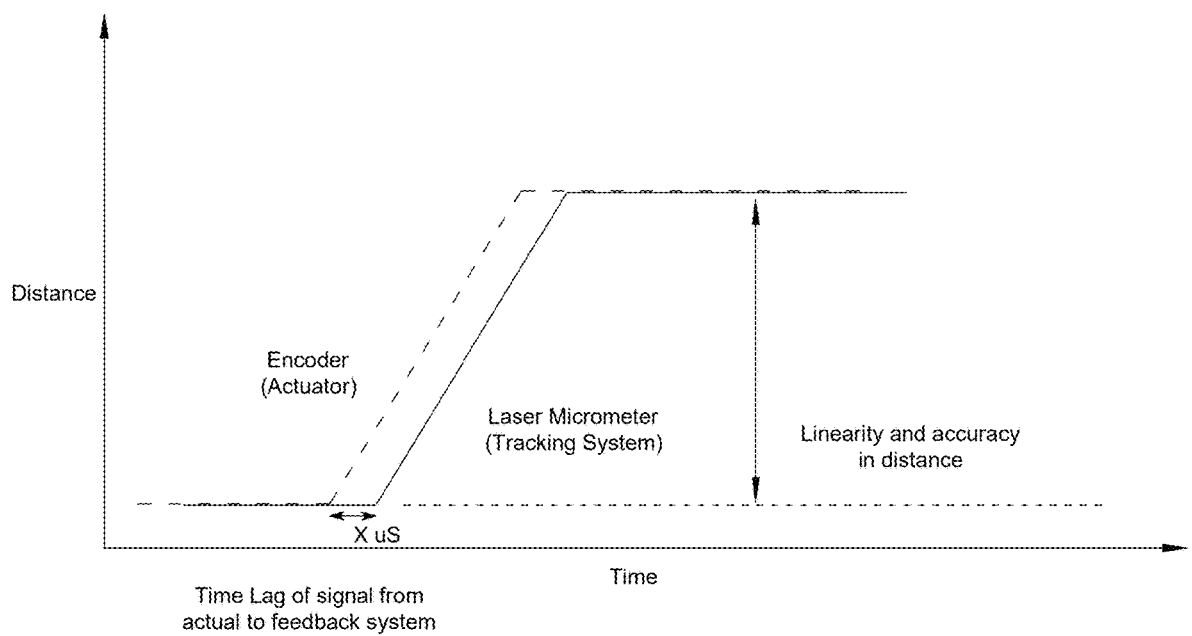
FIG. 9 is a graphical representation of time delay determinations.

As illustrated FIG. 9, the system 10 may be configured to account for time delays in receiving signals from sensors, carrying out analysis, transmitting commands to components (e.g., robot 16), carrying out commands, combinations thereof, or the like. In exemplary embodiments, without limitation, the position the robot 16 is commanded to place the wheel 12 or other component may be adjusted to account for such an anticipated time delay. For example, without limitation, the time delay may be multiplied by a measured velocity of the wheel 12 or other component and added to any position so that the robot 16 arrives where the wheel 12 or other component is. This may be particularly useful here where the parts to be assembled are in motion and/or for applications where tolerancing is relatively tight, as the respective positioning needs to be especially precise in either or both applications.

The time delay offset may be another factor used by the controller 24, and which may be adjusted overtime, such as based on feedback data from the inspection and adjustment by one or more artificial intelligence and/or machine learning techniques. For example, without limitation, where the inspection data reveals a placed part consistently ahead or behind the moving part, such as when accounting for other factors, the controller 24 may be configured to determine that the discrepancy is due to inadequate time delay and may automatically adjust the time delay parameter accordingly.

Figure 10:
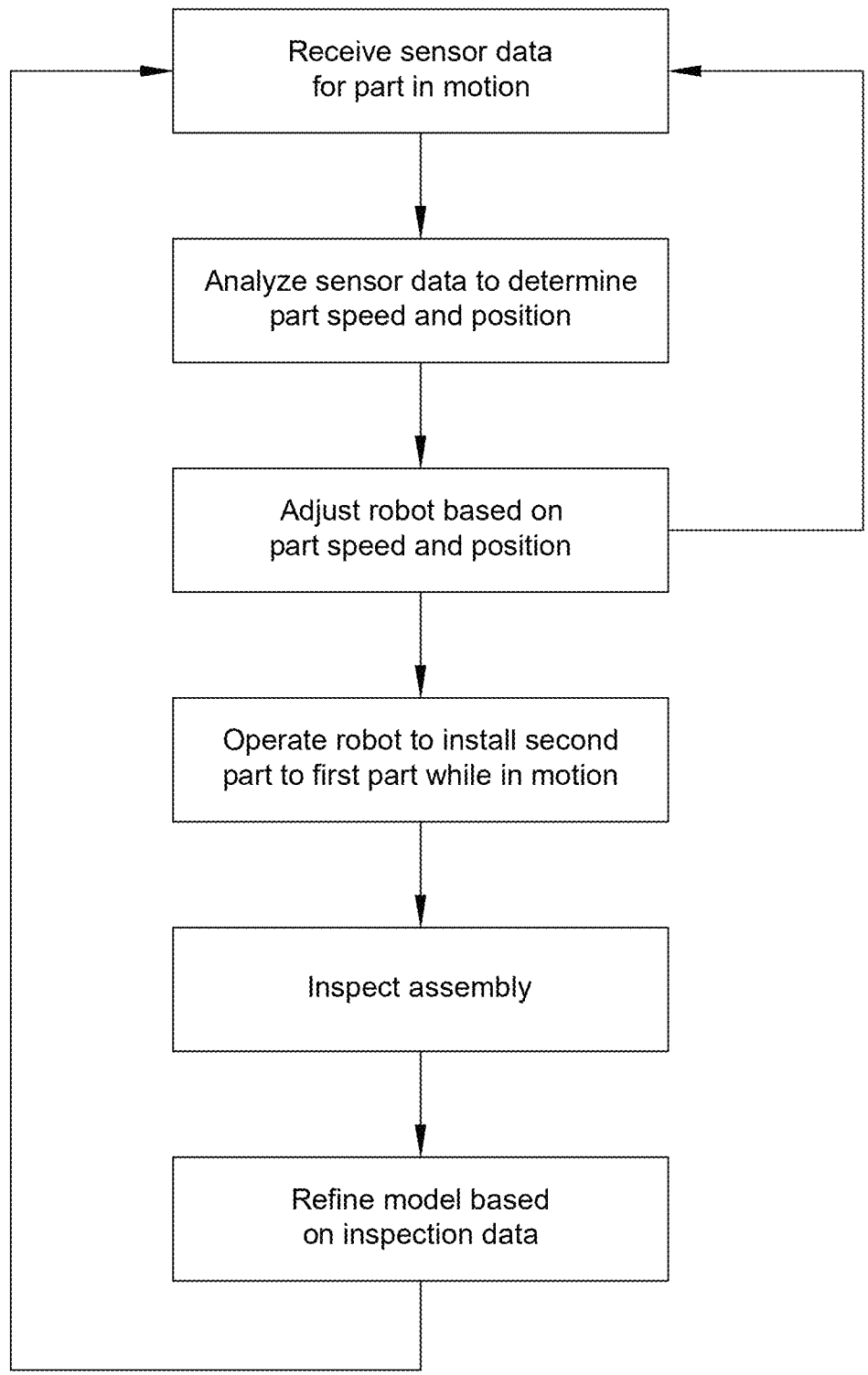
FIG. 10 is a flow chart with exemplary logic for operating the system of FIGS. 1-9.

As illustrated FIG. 10, the system 10 may be configured to regularly update commands based on sensor 22 data. For example, without limitation, robot 16 speed and/or position may be updated for each part and/or while a given part remains in motion. Assembly lines, for instance, may not always move at a constant speed, and this may allow adaptability when speeds change during a given assembly process.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein.

What is claimed is:

1. A system for installing a first component to a second component in motion to create an assembly, said system comprising:
   a conveying subassembly for transporting the second component through a work area;
   a robot for grasping and manipulating the second component and traveling through the work area alongside the conveying subassembly;
   one or more machine vision subsystems for sensing characteristics of the second component at the work area;
   one or more sensors configured for sensing movement of the second component at the work area; and
   a controller in electronic communication with the robot, the one or more sensors, and the one or more machine vision subsystems, said controller comprising software instructions which when executed, configure the controller to:
      receive calibration scan data from the one or more machine vision subsystems regarding position of a reference image placed at the conveying subassembly;
      update weightings of an artificial intelligence derived model in accordance with the calibration scan data, where the artificial intelligence derived model utilizes a multi-iterative, best fit, weighted vector analysis;
      receive data from the one or more sensors indicating speed and/or position information for the second component within the work area;
      receive data from the one or more machine vision subsystems regarding characteristics of the second component;
      calculate offsets between the characteristics of the second component and reference characteristics of the second component using the updated artificial intelligence derived model; and
      command the robot to install the second component at the first component while the second component remains in motion through the work area by, at least:
         adjusting the robot to account for the offsets; and
         matching the speed and position of the second component within the work area while the installation is underway;
      receive inspection scan data from the one or more machine vision subsystems of the assembly;
      determine offsets between features of the assembly and reference features of the assembly; and
      further update the artificial intelligence derived model in accordance with offsets.

2. The system of claim 1 wherein:
   the characteristics comprise outline position information and surface feature position information;
   the reference characteristics comprise reference outline position information and reference surface feature position information;
   the characteristics of the assembly comprises outline position information and surface feature position information; and
   the reference characteristics of the assembly comprises reference outline position information and reference surface feature position information.

3. The system of claim 1 wherein:
   the reference image comprises at least one optically scannable code.

4. The system of claim 1 wherein:
   the controller comprises additional software instructions, which when executed, configure the controller to:
      receive updated speed and/or position data from the one or more sensors during the installation; and
      update the commands to the robot in accordance with the updated speed and/or position data.

5. The system of claim 1 wherein:
   the one or more sensors comprise a laser.

6. The system of claim 1 wherein:
   the first component comprises a wheel; and
   the second component comprises a hub.

7. The system of claim 1 wherein:
   the one or more machine vision subsystems comprise a first set of one or more cameras positioned to view a storage area for the first component, and a second set of one or more cameras positioned to view a first portion of the work area.

8. The system of claim 1 wherein:
   the installation comprises at least one of: fastening and welding.

9. The system of claim 1 wherein:
   the conveying subassembly comprises an autonomous guided vehicle.

10. The system of claim 9 wherein:
   the conveying subassembly is in electronic communication with the controller to provide, at least in part, the speed and position information.

11. The system of claim 1 wherein:
   the conveying subassembly comprises an assembly line component.

12. The system of claim 1 wherein:
   the controller comprises a line PLC, an AI module, and line tracking interface board.

* * * * *